United States Patent [19]

Hengen et al.

[11] 4,037,745
[45] July 26, 1977

[54] COMBINE GRAIN TANK UNLOADING MECHANISM

[75] Inventors: Edward John Hengen, Bettendorf, Iowa; Eugene Byron Hutchinson, East Moline, Ill.

[73] Assignee: Deere & Company, Moline, Ill.

[21] Appl. No.: 656,321

[22] Filed: Feb. 9, 1976

[51] Int. Cl.² ............................................. B60P 1/40
[52] U.S. Cl. .................................. 214/521; 285/276; 198/668
[58] Field of Search ..................... 214/521, 522, 83.32, 214/83.26; 198/608, 589, 668; 285/276, 282, 184, 185

[56] References Cited

U.S. PATENT DOCUMENTS

| | | | |
|---|---|---|---|
| 3,108,703 | 10/1963 | Horne et al. | 214/522 |
| 3,638,812 | 2/1972 | Ryczek | 214/83.32 X |
| 3,664,525 | 5/1972 | Herbsthofer | 214/522 X |
| 3,721,333 | 3/1973 | Boone | 214/83.32 X |
| 3,872,982 | 3/1975 | Hill et al. | 214/520 X |

FOREIGN PATENT DOCUMENTS

| | | | |
|---|---|---|---|
| 2,353,025 | 5/1974 | Germany | 214/521 |

*Primary Examiner*—Albert J. Makay

[57] ABSTRACT

In a two-stage combine grain tank unloading system, grain is conveyed upward by a generally upright but forwardly inclined auger conveyor, through a transition housing into a generally horizontal unloading auger conveyor, which can be swingably adjusted, to discharge the grain away from the side of the combine, in a range of positions called an unloading zone. The unloading auger conveyor is rigidly attached to the transition housing which is free to swivel on a ring surrounding the upper end of the upright auger conveyor housing. The drive for the horizontal unloading auger is taken from the upright auger through a bevel gear case mounted partly within the transition housing. Provision of a universal joint coupling between the upright auger and the bevel gear case input shaft makes it possible to incline the swivel axis of the transition housing independently of the inclination of the axis of the upright auger conveyor, so that as the unloading auger conveyor is swung outwards from a generally fore-and-aft transport position to the unloading zone at the side of the combine, the angle of elevation above the horizontal of the unloading auger conveyor increases, to provide greater clearance for wagons or trucks positioned under the auger to receive grain. The forward inclination of the upright auger conveyor places the unloading zone closer to the operator so that he can better see and control the unloading operation.

17 Claims, 6 Drawing Figures

COMBINE GRAIN TANK UNLOADING MECHANISM

BACKGROUND OF THE INVENTION

This invention relates to an unloading mechanism for a combine grain tank and particularly to a two-stage system consisting of a generally upright auger conveyor carrying grain upwards from the grain tank and a generally horizontal auger conveyor to carry grain to a discharge point alongside the combine.

A particular advantage of such two-stage systems compared with earlier conventional unloading systems, in which a single auger conveyor extends outwards and upwards from a discharge point at the bottom of a grain tank, is that they provide inherently more clearance for maneuvering trucks and wagons alongside the combine and beneath the discharge point. This advantage is enhanced if swivel means are provided for swingably adjusting the position of the unloading auger conveyor during the unloading operation for better distribution of the grain in truck or wagon. Other advantages are that, typically, these are closed conveyor systems so that no grain is lost upon the ground if the unloading auger conveyor is moved to transport position while grain remains in the system, and the drive need not be interrupted while the unloading conveyor is being repositioned.

Typically, in two-stage systems, the unloading auger conveyor is swung to a fore-and-aft position for transport, when it is desirable to have it generally horizontal so as to maintain a minimum overall transport height. In that case, however, it becomes desirable when unloading for the discharge point to be elevated somewhat with respect to the inner end of the unloading auger conveyor to gain additional overhead clearance for the receiving vehicle. In existing applications of the two-stage unloading system concept, elevation of the unloading auger conveyor is achieved by making the axis of its swivel means coaxial with the axis of the upright auger conveyor but inclining the upright auger conveyor to the rear. The angle between the unloading and upright auger conveyor is typically greater than 90° so that, when swung into the unloading zone, the unloading auger conveyor becomes elevated above the horizontal. The disadvantage of this approach is that the rearward inclination of the upright auger conveyor and hence the fore-and-aft location of the unloading zone are dependent on the angle of elevation above the horizontal chosen for the unloading auger conveyor when in the unloading zone.

For transport it is convenient to swing the unloading auger conveyor of a two-stage unloading system so that it lies fore and aft along the upper edge of the grain tank and it is undesirable that it extend beyond the rear of the combine. But when the upright auger conveyor is inclined to the rear, rearward longitudinal space available for securing the unloading auger conveyor in transport position is severely limited.

Rearward inclination of the upright auger conveyor may also place the unloading zone so far to the rear as to make it difficult for the operator to monitor the unloading operation, especially when unloading on the move.

These limitations are becoming increasingly significant as combine field capacities continue to increase, grain tanks get bigger and unloading auger conveyors heavier and longer.

As grain tanks become larger there is more tendency to use tank configurations with more depth, both so as to avoid increases in overall height of the combine and also to maintain a low center of gravity for stability. An example of such a configuration is the so-called saddle tank straddling the combine. In such cases the outlet from the grain tank is often lower and further to the rear than in previous designs, thus compounding the problems arising from a rearward inclination of the upright auger conveyor.

As unloading auger conveyors become longer there is an increasing need for means of adjusting their angle of inclination to the horizontal, for example, to obtain proper register with support means which may be provided on the combine to support the unloading auger conveyor in the transport position. When the angle between the axes of the unloading and upright auger conveyor is fixed as in existing designs, provision of such an adjustment is not practicable.

SUMMARY OF THE INVENTION

Accordingly, an object of the present invention is to devise a two-stage unloading auger conveyor system free of the inherent limitations of existing systems, so that the fore-and-aft location of the unloading zone and the angle of elevation of the unloading auger conveyor above the horizontal when in the unloading zone are not interdependent but can be determined by their separate functional requirements and consideration of the basic dimensions of the vehicle concerned.

In the present invention, a transition housing is free to swivel on a ring carried at the upper end of the upright auger conveyor housing. The generally horizontal unloading auger conveyor is laterally offset from the upright auger conveyor and rigidly attached to the transition housing with its axis generally perpendicular to the swivel axis of the transition housing. The drive for the unloading auger conveyor is taken from the upper end of the upright auger conveyor, through a bevel gear case carried partly within the transition housing, thence by drive means, such as chain and sprocket, to a shaft extension of the unloading auger conveyor, external to the transition housing. Slinger paddles carried by the gear case input shaft assist the flow of grain through the transition housing.

A feature of the invention is making the inclination of the swivel axis of the transition housing, and hence the angle of elevation of the unloading auger conveyor axis, independent of the inclination of the axis of the upright auger conveyor. This is facilitated by the introduction of a universal joint between the end of the upright auger and the input shaft of the gear case in the transition housing. Thus, in operation, if the swivel axis is inclined from the vertical, then, as the unloading auger conveyor is swung or swiveled about the upright auger conveyor, both the height of the discharge point of the unloading auger conveyor and the angle between the axes of the upright and unloading auger conveyors change, and therefore the angle of inclination of the swivel axis can be chosen for optimum disposition of the unloading auger conveyor both in transport position and in the unloading zone. For example, if the swivel axis is inclined away from the unloading side in a plane transverse to the combine, or to the rear in a fore-and-aft plane, or is inclined in any plane between these two, then the height of the discharge point will increase as the unloading auger is swung towards the unloading zone.

Accordingly, with the present invention, a desirable forward location for the unloading zone may be achieved by inclining the upright auger conveyor forward so that the transition housing is immediately behind the operator station. A forward location for the transition housing also makes a maximum of fore-and-aft space available for the transport position of a longer unloading auger conveyor, while keeping it within the overall length of the combine. This is particularly valuable in a combine equipped with favorable axial flow rotary separator when elimination of the conventional straw walkers reduces overall length of the combine.

Another feature of the invention also derives from making the inclination of the swivel axis independent of the upright auger axis. Within the transition housing, the gear case input shaft may further be independently inclined. Thus a designer may select an angle for the input shaft to effect a avorable juxtaposition of slinger paddles, upright and unloading augers for more efficient grain transfer, and to achieve compactness in the drive system and in the transition housing itself.

Still another feature of the invention is to provide for rotational adjustment of the swivel ring at its point of attachment to the upright auger housing. Because of the relative inclination of the swivel axis, the effect of this adjustment is to change the angle of elevation of the unloading auger conveyor and this feature can be used to adjust the register of the conveyor with its transport cradle to compensate, for example, for wear in the swivel ring which supports the transition housing on the upright auger conveyor or for manufacturing variations.

DESCRIPTION OF THE PREFERRED EMBODIMENT

Figure 2:
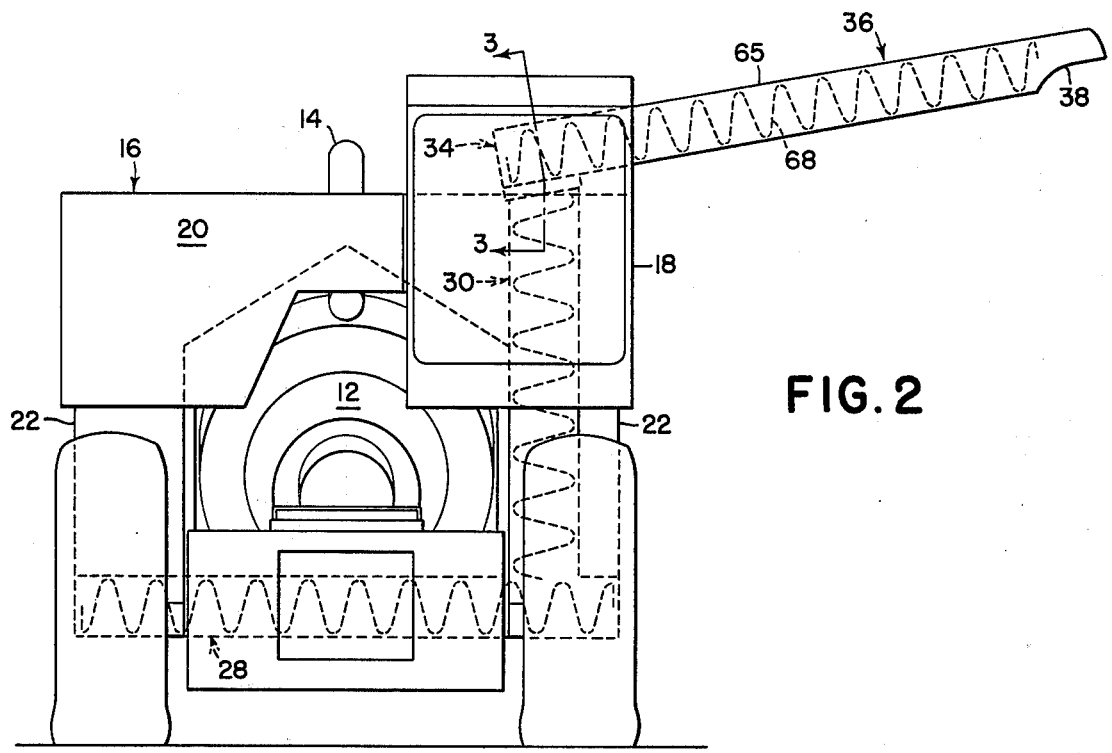
FIG. 2 is a front elevation of the combine showing the unloading auger conveyor in the unloading zone.

The invention is embodied in a self-propelled combine having a harvesting unit, such as a corn head 10, which gathers and delivers crop to an axial flow rotary crop processing unit 12, which in turn delivers it by means of a clean grain conveyor 14 to a grain tank 16, shown in FIG. 2 in front elevation, straddling the harvester. An operator's station 18 is mounted on the combine forward of the grain tank.

The grain tank 16 includes an elevated central section 20 communicating with a pair of depending saddle sections 22. The floors 24 and 26 of these saddle sections converge downwardly and direct grain to a transverse auger conveyor 28 operable to deliver grain from the saddle tank sections to an upright auger conveyor 30. The transverse and upright conveyors are driven by a combined engine 32 through conventional means (not shown).

Grain is conveyed upwards by the upright auger conveyor, through a transition housing 34, swingably mounted on the upper end of the upright conveyor, and into an unloading auger conveyor 36, which conveys it for discharge through an opening 38 at its outer end.

Figure 1:
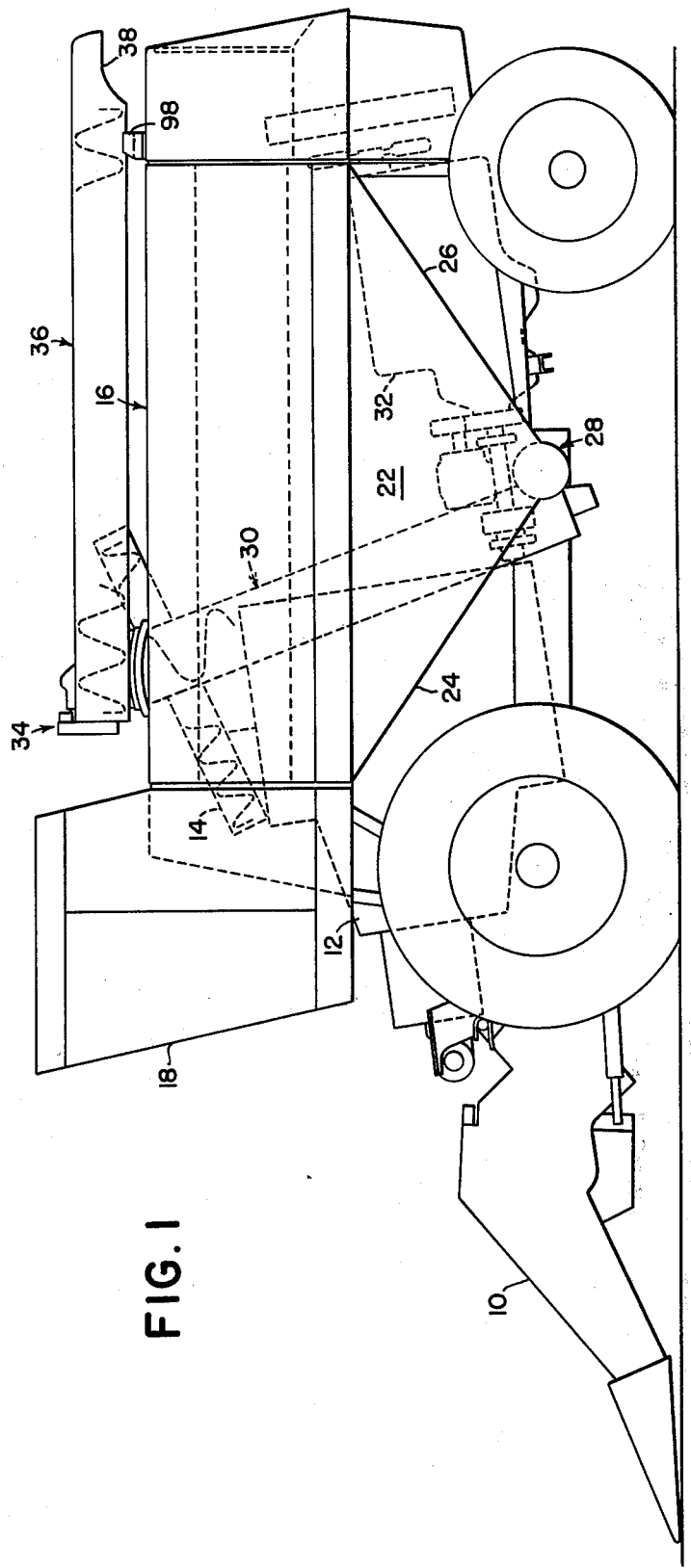
FIG. 1 is a side elevation of a combine embodying the improved grain tank unloading system.

Turning to FIGS. 1 and 2, it will be seen that the upright auger conveyor 30 is mounted within the left-hand saddle tank section and is inclined forward so as to place the transition housing 34 adjacent the front of the grain tank immediately behind the operator's station. The upright conveyor is secured at its upper end to the tank structure by suitable means such as brackets 42 shown in FIG. 5.

The upper end of the upright auger conveyor 30 lies at about the same level as the top of the grain tank 16. The conveyor 30 includes a tubular auger housing 44, the upper edge of which lies in a plane parallel to the longitudinal axis of the combine but sloping downwards and inwards as indicated in FIG. 4. Attached to the end of the housing by suitable means such as screw fasteners 46 is a swivel bearing assembly 40 generally concentric with the upright auger housing, the plane of the swivel being parallel to the plane of the upper edge of the housing. The swivel assembly 40, shown in section in FIG. 3, consists of a bearing ring 50 secured to the auger housing, a swivel ring 52 concentric with it, and bearing balls 54 between the rings, so that the swivel ring can swivel freely on the bearing ring. Means such as generally circumferential slots 56 for the screw fasteners 46 in the end of the auger housing are provided for rotational adjustment between the bearing ring and the auger housing.

Mounted on the swivel ring 52 is the transition housing 34, which in general form consists of two intersecting cylindrical surfaces, the first being an upright cylinder 58 extending upwards from the swivel ring, and the second a generally horizontal cylinder 60. These surfaces are defined by suitable material such as sheet metal.

Figure 3:
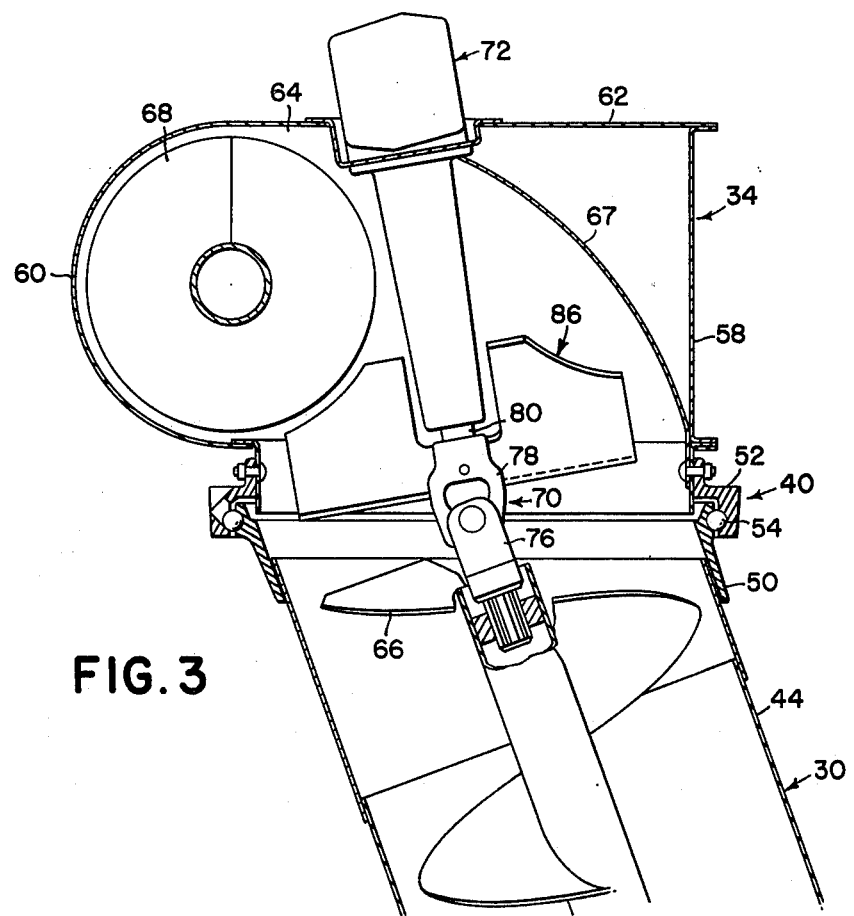
FIG. 3 is a partial sectional view of the unloading system through the transition housing along line 3—3 in FIG. 2 with the unloading auger conveyor extending perpendicularly from the side of the combine in the unloading zone.
Figure 4:
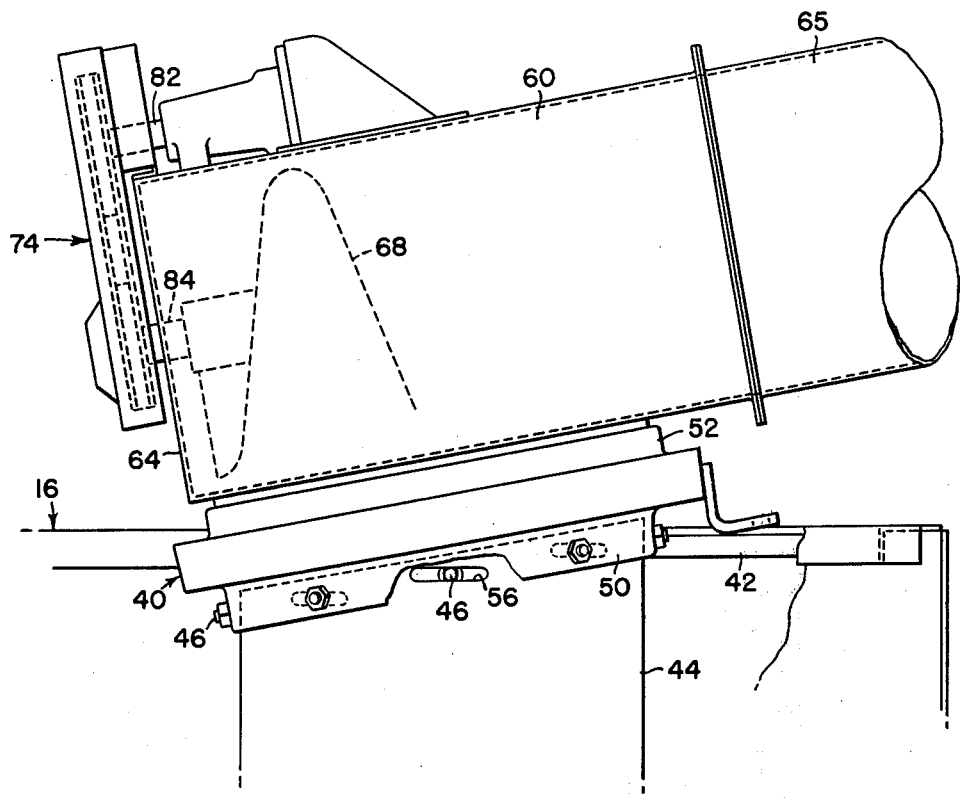
FIG. 4 is a front elevation of the transition between the upright and unloading auger conveyors with the unloading auger conveyor in the unloading zone and with the bearing ring partially cut away to show the bearing ring adjustment means.

Referring to FIGS. 3 and 4 it is seen that the bottom of the first cylinder 58 is open to communicate with the upright auger housing 44 but is closed at the top by a cap 62 which becomes co-extensive with the wall 60 of the second cylinder. In similar fashion, the horizontal second cylinder 60 is closed at its inner end by a cap 64 which becomes co-extant with the wall of the first cylinder 58. The unloading auger conveyor 36 includes a tubular housing 64 that coaxially extends from and communicates with the open end of the cylinder 60. Thus, the housings of the upright and unloading augers, with the transition housing between, define a continuous passage for the conveying of grain. Supported within the transition housing is a curved grain deflecting baffle 67.

Supported within the auger housings 44 and 65 are conveyor augers 66 and 68 respectively. The upright auger 66 ends approximately level with the upper edge of upright auger housing 44 and the unloading auger 68 extends the full length of its housing 65 and the cylinder 60 of the transition housing, between the cap 64 and the discharge opening 38.

The unloading auger 68 is connected to the upright auger 66 by a drive means, including a universal joint 70, a bevel gear case 72 carried partly within the transition housing, and a chain and sprocket drive 74.

The universal joint includes a first yoke 76 coaxial with and attached to the upper end of the upright auger 66 and a second yokd 78 coaxial with and attached to an input shaft 80 of the gear case. Drive is transferred from a gear case output shaft 82 to the unloading auger drive shaft 84 by the chain and sprocket drive 74. Attached to and coaxial with the second yoke 78 is a set of slinger paddles 86.

It can be seen in FIG. 3 that the input shaft 80 of the bevel gear case 72 is inclined towards the unloading auger 68 in a plane transverse to that auger. The angle of inclination chosen reduces the angularity of the universal joint between the upright auger and gear case input shaft for a smoother drive and to permit close continuity in conveying action between the end of the upright auger 66 and the paddles 86 while maintaining a compact configuration in the transition housing.

Figure 5:
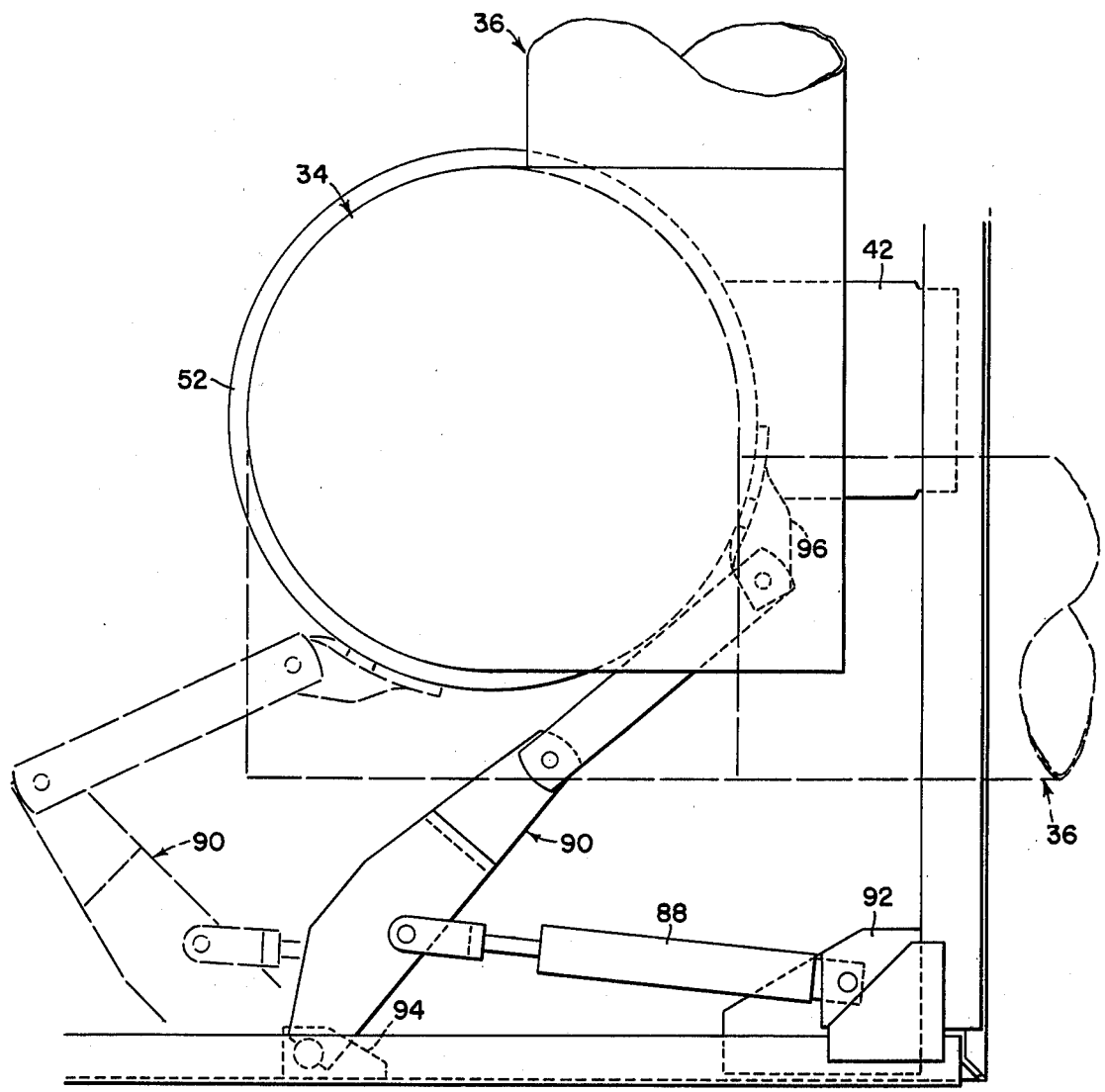
FIG. 5 is a partially schematic top view showing the control means for positioning the unloading auger conveyor.

Turning to FIG. 5, control means, such as a hydraulic cylinder 88 and linkage 90, are provided for controlling the position of the unloading auger conveyor. In the embodiment illustrated, the hydraulic cylinder 88 is pivotally anchored to a corner of the grain tank by a bracket 92. The other end of the cylinder is pivotally connected to a two-bar linkage 90, one end of which is pivotally connected to a bracket 94 attached to the tank, and the other end of which is connected to a bracket 96 attached to the swivel ring 52 of the transition housing. Conventional means (not shown) supply oil under pressure for operation of the hydraulic cylinder and conventional control means for it are provided in the operator's station. As indicated in FIG. 5, extension or retraction of the hydraulic cylinder causes the swivel ring 52 and hence the unloading auger conveyor 36 to swivel about the upright auger conveyor 30.

Figure 6:
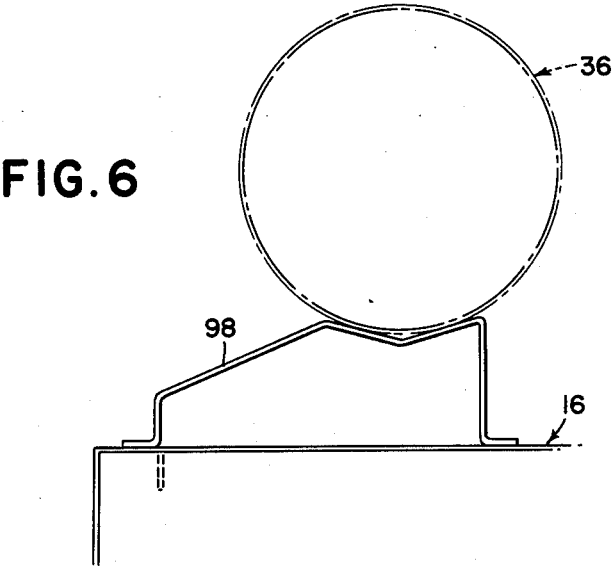
FIG. 6 is a partial rear elevation showing the cradle for supporting the unloading auger conveyor when in transport position.

To minimize vehicle width during transport the unloading auger conveyor is supported with its axis for and aft, close to the upper left-hand side of the grain tank as shown in FIG. 1. It is supported towards its discharge end by a cradle 98 mounted on the combine near the left-hand top corner of the tank and shown in more detail in FIG. 6.

In operating the unloading system, the operator moves a hydraulic control lever causing hydraulic cylinder 88 to extend and displace the unloading auger conveyor 36 from its support cradle 98 thus swinging it from a transport position to any position in an unloading zone in which the conveyor extends laterally from the combine. The unloading zone is somewhat indeterminate but is here defined as that range of positions in the swingable range of the unloading auger conveyor 36 in which grain discharged from the combine can be received by such means as truck or grain wagon. In FIG. 5 the unloading auger conveyor 36 is shown in phantom outline in an intermediate unloading zone position wherein it extends perpendicular to the line of travel.

Inclination of the axis of the swivel assembly 40 is such that, in transport, the unloading auger conveyor 36 is horizontal as shown in FIG. 1, but as can be seen from FIG. 4, in any position in the unloading zone the axis of the unloading auger conveyor will be elevated above the horizontal.

When the drive means is engaged, grain is received from the tank 16 via the transverse conveyor 28 into the upright auger conveyor 30 and conveyed upwards into the transition housing 34. Transfer into the unloading auger conveyor 36 is assisted by the slinger paddles 86, which accelerate the grain centrifugally from the upright auger conveyor 30 towards the unloading auger conveyor 36 and axially in the direction of flow of the unloading auger conveyor, and by the deflecting action of baffle 67. Grain is discharged from the outer end of the unloading auger conveyor through opening 38.

For transport, the auger conveyor 36 is again swung into a fore-and-aft position with its outer end supported in cradle 98. If it is necessary to raise or lower the outer end of the unloading auger conveyor to obtain proper register with the cradle 98, the fasteners 46 attaching the bearing ring 50 to the upright auger housing 44 are loosened and the bearing ring rotatably adjusted on the housing as required. The inclination of the plane of the bearing ring relative to the axis of the upright conveyor housing causes such rotational adjustment to have a camming effect which increases or decreases the angle of elevation of the unloading auger conveyor.

As is apparent, the position of the unloading auger conveyor in the unloading zone can be adjusted during the unloading operation by actuating the hydraulic cylinder 88, allowing the operator to load different areas of the receiving vehicle or to accommodate different relative positions between the receiving vehicle and the combine when unloading on the move. As is also apparent, the position of the unloading auger conveyor close to the operator's station provides good visibility for the operator to allow accurate deposit of the grain in the receiving vehicle.

It will also be seen that, although the combine described is equipped with an axial flow rotary crop processing unit and is relatively short in relation to field capacity and grain tank size, the long unloading auger conveyor is comfortably accommodated within the length of the vehicle because of the forward inclination of the upright auger conveyor.

We claim:

1. In a combine harvester having a grain tank for temporarily holding processed grain and an unloading system for unloading grain from the harvester, the improvement in the unloading system comprising:

a generally upright auger conveyor operable to convey grain from the tank upwards and having an axis of rotation and an upper end;

an unloading auger conveyor having inner and outer ends and an axis of rotation and operable to receive grain from the upright conveyor at its inner end and discharge it from its outer end; and mounting means carrying the unloading conveyor at the upper end of the upright conveyor, the mounting means including swivel means whereby the unloading conveyor may be positioned in a transport position and in a range of unloading positions, called an unloading zone, the swivel means having an axis of rotation, said axis being inclined to the axis of rotation of the upright conveyor so that the angle of the axis of rotation of the unloading conveyor relative to that of the upright conveyor changes between the transport position and positions in the unloading zone, said mounting means further including a housing, connected to the inner end of the unloading auger conveyor in communication therewith, and an annular bearing means around the upper end of the upright auger conveyor pivotally mounting the housing on the upper end of the upright auger conveyor in communication therewith.

2. The invention defined in claim 1 wherein the axis of rotation of the swivel means is inclined away from the unloading zone so that the height above the ground of the outer end of the unloading conveyor is greater when in the unloading zone than in the transport position.

3. The invention defined in claim 2 wherein the axis of rotation of the swivel means lies in a vertical plane transverse to the combine.

4. The invention defined in claim 2 wherein the upright auger conveyor is inclined forward so that its upper end is closer to the front of the combine.

5. The invention defined in claim 4 wherein the combine includes an operator's station immediately forward of the grain tank and the upper end of the upright auger conveyor is disposed adjacent the forward end of the grain tank.

6. The invention defined in claim 5 wherein the outer end of the unloading auger conveyor when in transport position does not substantially extend beyond the rearward extremities of the combine.

7. The invention defined in claim 1 wherein the mounting means includes releasable fastening means operative between the mounting means and the upright auger conveyor whereby the mounting means may be rotatably adjusted relative to the upright conveyor and secured in different positions so that the plane of inclination of the axis of rotation of the swivel means may be adjusted relative to the combine.

8. In a combine having a mobile main frame and a grain tank mounted on the frame and having opposite lateral sides and discharge means adjacent the bottom of the tank, the combination therewith of an improved unloading conveyor system for the grain tank comprising:
 a generally upright auger conveyor having a lower end communicating with the grain tank discharge means and an upper end, the upright conveyor means being adapted to move grain from its lower end to the upper end;
 an unloading auger conveyor having inner and outer ends;
 a pivotal mounting means, swingably mounting the inner end of the unloading auger conveyor on the upper end of the upright auger conveyor in a crop transfer relationship therewith, for swinging of the unloading auger conveyor between a generally fore-and-aft transport position and an unloading position wherein the outer end is disposed outwardly of the grain tank side, the pivot axis of the mounting means being inclined relative to the vertical and to the axis of the upright auger conveyor so that the outer end of the unloading auger conveyor is disposed at a greater elevation in the unloading position than in the transport position, said mounting means further including a housing, connected to the inner end of the unloading auger conveyor in communication therewith, and an annular bearing means around the upper end of the upright auger conveyor pivotally mounting the housing on the upper end of the upright auger conveyor in communication therewith; and
 control means operatively connected to the unloading auger conveyor for shifting the conveyor between its different positions.

9. The invention defined in claim 8 wherein the axis of the annular bearing means intersects the axis of the upright auger conveyor.

10. The invention defined in claim 8 and including drive means drivingly connecting the upright auger conveyor to the unloading auger conveyor and including a generally upright drive shaft disposed in the housing and inclined relative to the axis of the upright conveyor, a universal joint means operatively connecting the upright conveyor to the drive shaft, bevel gear means drivingly connecting the upright drive shaft to a generally horizontal drive shaft, and means drivingly connecting the horizontal drive shaft to the unloading auger conveyor.

11. The invention defined in claim 8 wherein the combine includes an operator's station disposed at the front of the main frame immediately in front of the grain tank, and the grain tank discharge means is located substantially to the rear of the operator's station, the upright auger conveyor being inclined upwardly and forwardly so that the upper end of the conveyor is disposed adjacent the forward end of the grain tank immediately to the rear of the operator's station.

12. A combine harvestor comprising:
 a grain tank for temporarily holding processed grain, said tank having an unloading side;
 an upright auger conveyor adjacent to the unloading side of the grain tank for receiving grain from said tank and conveying it upwards, said conveyor being inclined forward and having a housing and an upper end;
 drive means for operating said conveyor;
 swivel means carried by the upright auger conveyor at its upper end and surrounding the conveyor housing, the rotational axis of the swivel means being inclined away from the unloading side of the grain tank in a generally vertical and inclined to the axis of the upright conveyor and transverse to the combine;
 a conveyor transition housing mounted on the swivel means connected to the inner end of the unloading auger conveyor in communication therewith, and an annular bearing means around the upper end of the upright auger conveyor pivotally mounting the housing on the upper end of the upright auger conveyor in communication therewith;
 an unloading auger conveyor having inner and outer ends carried at its inner end by the conveyor transition head and adapted to receive grain from the upright auger conveyor at its inner end and discharge grain from the combine at its outer end, said unloading conveyor being swingable about the axis of the swivel means between a transport position, in which it lies substantially horizontal and parallel to the fore-and-aft axis of the combine, and a range of unloading positions in which its outer end is higher than its inner end because of the angle of inclination of said swivel means;
 control means for controlling the swiveled position of the unloading auger conveyor; and
 drive means carried by the conveyor transition housing drivingly connecting the upright conveyor to the unloading conveyor.

13. The invention defined in claim 12 wherein said grain tank has an elevated central portion and two opposite side depending portions, the three portions together forming a saddle tank which straddles the combine and wherein said upright auger conveyor is disposed substantially within one of the side depending portions.

14. The invention defined in claim 12 wherein the inner end of the unloading auger conveyor is laterally offset from the upper end of the upright auger conveyor and wherein the drive means carried by the conveyor transition head includes a bevel gear case carried substantially within the head, said gear case having an upright input shaft connected to the upright conveyor and inclined towards the unloading conveyor in a plane generally transverse to the axis of the unloading conveyor.

15. The invention defined in claim 14 wherein the drive means includes slinger paddles carried by said input shaft, said paddles aiding the transfer of grain from the upright conveyor to the unloading conveyor.

16. The invention defined in claim 12 wherein the combine includes support means operative to support the unloading auger conveyor adjacent its outer end when in its transport position, and wherein the swivel means includes adjusting means operative to rotatably adjust the swivel means on the vertical conveyor housing so that the direction of inclination of the swivel means can be adjusted whereby the outer end of the unloading conveyor can be brought into proper vertical relationships with said support means.

17. The invention defined in claim 12 wherein the longitudinal axis of the unloading auger conveyor lies in a plane perpendicular to the rotational axis of the swivel means.

* * * * *

UNITED STATES PATENT OFFICE
CERTIFICATE OF CORRECTION

Patent No. 4,037,745        Dated 26 July 1977

Inventor(s) Edward John Hengen and Eugene Byron Hutchinson

It is certified that error appears in the above-identified patent and that said Letters Patent are hereby corrected as shown below:

Column 8, line 27, delete "harvestor" and insert --harvester--; line 40 after "a" insert --plane--.

Signed and Sealed this

Twelfth Day of February 1980

[SEAL]

Attest:

SIDNEY A. DIAMOND

Attesting Officer         Commissioner of Patents and Trademarks